Oct. 18, 1932.     L. EMANUELI     1,883,648
MULTICORE OIL FILLED HIGH TENSION ELECTRIC CABLE

Filed July 12, 1929

Inventor
Luigi Emanueli,
By Stone, Boyden, Mack & Hahn,
Attorneys

Patented Oct. 18, 1932

1,883,648

UNITED STATES PATENT OFFICE

LUIGI EMANUELI, OF MILAN, ITALY, ASSIGNOR TO SOCIETA ITALIANA PIRELLI, OF MILAN, ITALY

MULTICORE OIL-FILLED HIGH TENSION ELECTRIC CABLE

Application filed July 12, 1929, Serial No. 377,851, and in Italy July 9, 1928.

The present application is a continuation in part of my prior application Serial No. 328,655 filed December 27, 1928.

This invention relates to multicore high tension electric cables having internal longitudinal channels filled with oil or fluid insulating compound for the purpose of permanently feeding the impregnated insulation of the cable, the channels being placed in communication at predetermined distances along the cable, for example at the terminals or at some of the joints, with feeding tanks or reservoirs containing oil or fluid insulating compound.

Whilst in single core cables these cavities can be placed inside the conductor or between the insulation and the lead sheath, in multicore cables, that is those with more than one conductor, they are generally placed in the spaces between the cores, abolishing the fillings which are usually used. The substitution of oil only, however, for the solid filling reduces the dielectric strength of the cable to a lower value, because the oil, which has a lower dielectric strength than that of the impregnated insulation, is located in the weakest points of the cable, that is in the points adjacent to those of the mutual contact of the cores.

The present invention has for its object to provide a multicore cable in which even though the cavities for the oil are located in the spaces between the cores, a high dielectric strength is maintained in the points adjacent to those of the mutual contact of the cores.

For this purpose, according to the present invention a multicore high tension electric cable, wherein channels, which are filled with oil or fluid insulating compound, are located in the spaces between the cores and the sheath, is characterized in that small internal fillings, made of material permeable to oil, are provided in the spaces enclosed between the walls of the channels and the cores and defined by the points of contact with one another of two cores and the walls of a channel or of one core and the walls of two channels.

In the case for example of one construction of three cores cable in accordance with the invention, there would be a central filling occupying the central space between the three cores, and three internal fillings, each such latter filling being closely wedged in the space adjacent to the point of mutual contact of two cores. In each of the spaces between the cores there is also an oil-filled tubular channel, the walls of one or more of which channels are made permeable to oil and keep in place and well pressed the corresponding internal filling. The remaining lateral spaces between the tubular channels and the cores can also be occupied with small fillings termed peripheral fillings. Over the cores, the walls of the channels, and the peripheral fillings the lead sheath of the cable is placed, with or without the interposition of the usual external insulated belt.

The spaces inside the tubular channels serve to contain the oil or fluid insulating compound, channels with permeable walls feeding the cable through which they pass, whilst channels with impermeable walls serve to carry oil to some distant part of the cable without loss on the way.

In order that the invention may be clearly understood and readily carried into effect, the same will now be described more fully with reference to the accompanying drawing, in which:—

Figure 9:
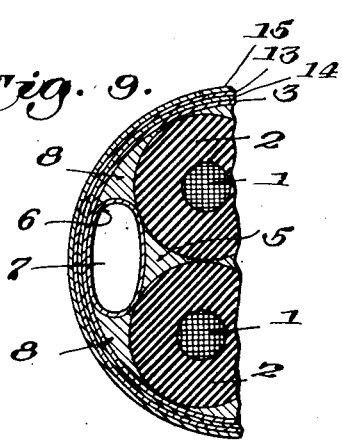
Figure 10:
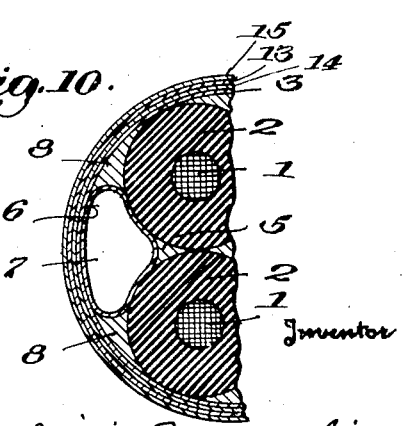

Figures 4 to 8 inclusive illustrate various types of the tubular channels with permeable walls, and Figures 9 to 10 inclusive illustrate various forms of cross-section of the tubular channels.

Figure 1:
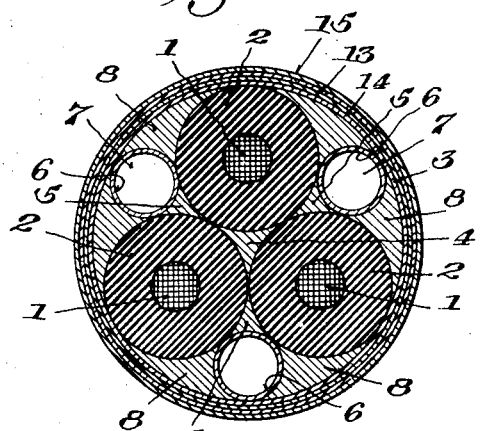
Figure 1 illustrates in section one construction of three phase cable in accordance with the present invention.
Figure 2:
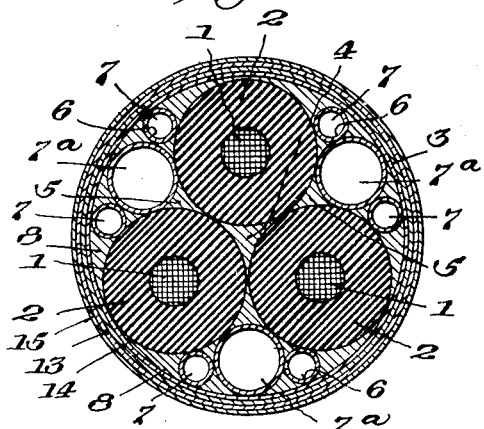
Figure 2 is a section view of another construction of three phase cable according to the invention.
Figure 3:
Figure 3 illustrates a tubular channel with impermeable walls.

In the construction of cables illustrated in Figures 1 and 2 there are shown the conductors 1, the insulation 2, the lead sheath 3, the central filling 4, and internal fillings 5, the walls 6 of the tubular channels, the tubular channels 7 (Figure 1) or 7 and 7a (Figure 2) and the peripheral fillings 8.

Figure 4:
Figure 5:
Figure 6:
Figure 7:
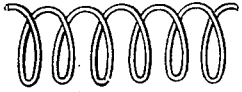
Figure 8:
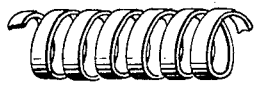

The walls of the tubular channels can be made either of electrically insulating or conductive material, whilst one or more of them are made permeable to the oil or fluid insulating compound. In the case for example of the cable illustrated in Figure 1, one or more of the channels 7 are made with permeable walls 6, whilst in the case of the cable illustrated in Figure 2 the large central channels 7a may be provided with impermeable walls and the smaller channels 7 with permeable walls, or vice versa. When they are made permeable to the oil the walls of the channels can have the form of a meshed tube, (as shown in Figure 4), or a thin walled tube with small perforations or holes therein (see Figure 5) or with cuts or slits as shown in Figure 6, or they may have the form of a short lay wire helix (see Figure 7), or tape helix (see Figure 8), the tape having the edges rounded towards the inside of the helix.

The cross section of the tubular channels may be circular as shown in Figure 1, or elliptical as shown in Figure 9, or of any other form which conforms with the bounding surfaces of the cores and lead sheath as illustrated for example in Figure 10, the dimensions of the internal and peripheral fillings being, of course, determined by the section of the tubular channels.

When the walls of the channels are formed of electrically conductive material it may be convenient, in some cases, that the internal fillings also be made of electrically conductive material for example a filler of paper containing in suspension metallic powder, or a paper filler covered with metallized paper, or a substance consisting of conducting materials reduced to the finest powder; these may, moreover, be in electrical communication with the lead sheath, for instance, in the joints between the various lengths of cable, in which case the electric field in each core does not differ very much from the perfectly radial one of single core cable.

To prevent the lead sheath from expanding or bulging due to the pressure of the oil within the cable, it may be advisable in many cases to wrap the lead sheath with a thin metal tape 13. This tape or ribbon may also be made of iron or other magnetic metal, as the power losses thus introduced in a multicore cable are still admissible. To prevent the tape and particularly the edges thereof from cutting into the lead sheath 3 a few layers of suitable material such as paper 14 are interposed between the two. An outer lead sheath 15 surrounds the cable thus formed and protects the metal tape from chemical action of external agents.

The improved type of multicore cable according to the present invention described above has all the advantages of all cables with oil-feeding channels in the spaces between the cores, that is it has a section sufficiently large to render easy the feeding of oil without increasing the diameter of the cable, whilst at the same time however it has not the disadvantages of the known types previously mentioned in which latter the oil occupies entirely the spaces adjacent to the points of mutual contact of the cores, thus lowering sensibly the dielectric strength of the cable. No claims are made herein based solely on the provision of a cable having longitudinal channels the walls of one or more of which are permeable to the fluid insulating compound, as this subject matter is contained in a prior co-pending application filed by me.

Having now particularly described and ascertained the nature of my said invention and in what manner the same is to be performed, I declare that what I claim is:—

1. In a multicore high tension cable, the combination of conductors, a covering of permeable insulation for each conductor, an outer covering therefor, channels for conveying fluid which are located in the spaces between the insulation on the conductors and said covering, some of said channels being permeable to fluid and feeding it directly to the insulation on the conductors, the remainder being impermeable to fluid for conveying it from one point to a distant part of the cable, and fillers which are permeable to the fluid and which are held in a compressed state between the walls of the channels, the insulation on the conductors and the outer covering.

2. In a high tension cable, the combination of three conductors which are bound together, a covering of insulation for each conductor through which fluid is free to pass into and from the said insulation, a permeable filler body located in the central region between the conductor insulations, an outer covering for the said conductors, a fluid carrying channel located in each of the spaces defined by the insulation on the conductors and the inner wall of the covering, some of said channels being permeable to fluid and feeding it directly to and receiving it from the conductor insulations, and the remainder being impermeable to fluid for conveying it from one point to a distant part of the cable, and permeable fillers which are wedged into the spaces immediately adjacent the channels.

3. In a high tension cable, the combination of conductors arranged about a common center, a covering of permeable insulation for each conductor, an outer metal sheath for the conductors, metal walled channels which are located in the spaces between the insulation on the conductors and are in contact with the inner wall of the sheath, some of said channels being permeable to fluid and feeding it directly to the insulation on the conductors, the remainder being impermeable to the fluid for conveying it from one point to a distant part of the cable, and fillers which are made of electrically conductive material located in the spaces between the channels and the inner wall of the sheath.

4. In a multicore, high tension, oil filled electric cable, a plurality of conductors, a covering of permeable insulation for each of said conductors, an impervious sheath enclosing said insulated conductors, a plurality of channels for conveying fluid within each of the spaces defined between the permeable insulation of adjacent conductors and the enclosing sheath, some of said channels being permeable to fluid and conveying the same to the insulation upon the conductors, and some of said channels being impermeable to fluid for conveying it from one point to a distant part of said cable, and permeable fillings in the remaining spaces defined within said enclosing sheath.

5. In a multicore, high tension, oil filled electric cable, a plurality of conductors, a covering of permeable insulation for each of said conductors, an impervious sheath enclosing said insulated conductors, a plurality of channels for conveying fluid within each of the spaces defined between the permeable insulation of adjacent conductors and the enclosing sheath, some of said channels being permeable to fluid and conveying the same to the insulation upon the conductors, and some of said channels being impermeable to fluid for conveying it from one point to a distant part of said cable, and permeable fillings in the remaining spaces defined within said enclosing sheath, a metallic reenforcing tape encircling said sheath, an encircling tape interposed between said sheath and said metallic tape and an outer wear resisting sheath covering said metallic tape.

6. In a multicore, high tension, oil filled electric cable, a plurality of conductors, a covering of permeable insulation for each of said conductors, an impervious lead sheath enclosing said insulated conductors, a plurality of channels for conveying fluid within each of the spaces defined between the permeable insulation of adjacent conductors and the enclosing sheath, some of said channels being permeable to fluid and conveying the same to the insulation upon the conductors, and some of said channels being impermeable to fluid for conveying it from one point to a distant part of said cable, and permeable fillings in the remaining spaces defined within said enclosing sheath, a metallic reenforcing tape encircling said sheath, an encircling paper tape interposed between said sheath and said metallic tape and an outer lead sheath covering said metallic tape.

7. In a multicore high tension cable, the combination of conductors, a covering of permeable insulation for each conductor, an outer covering therefor, channels for conveying fluid which are located in the spaces between the insulation on the conductors and said covering, some of said channels being permeable to fluid and feeding it directly to the insulation on the conductors, the remainder being impermeable to fluid for conveying it from one point to a distant part of the cable, said permeable channels comprising a thin metal ribbon wound flatwise to form a helix, and fillers which are permeable to the fluid and which are held in a compressed state between the walls of the channels, the insulation on the conductors and the outer covering.

8. In a multicore high tension cable, the combination of conductors, a covering of permeable insulation for each conductor, an outer covering therefor, channels for conveying fluid which are located in the spaces between the insulation on the conductors and said covering, some of said channels being permeable to fluid and feeding it directly to the insulation on the conductors, the remainder being impermeable to fluid for conveying it from one point to a distant part of the cable, and electrically conductive fillers which are permeable to the fluid and which are held in a compressed state between the walls of the channels, the insulation on the conductors and the outer covering.

9. In a multicore, high tension, oil filled electric cable, a plurality of conductors, a covering of permeable insulation for each of said conductors, an impervious sheath enclosing said insulated conductors, a plurality of channels for conveying fluid within each of the spaces defined between the permeable insulation of adjacent conductors and the enclosing sheath, some of said channels being permeable to fluid and conveying the same to the insulation upon the conductors, and some of said channels being impermeable to fluid for conveying it from one point to a distant part of said cable, and electrically conductive permeable fillings in the remaining spaces defined within said enclosing sheath.

10. In a multicore, high tension, oil filled electric cable, a plurality of conductors, a covering of permeable insulation for each of said conductors, an impervious sheath enclosing said insulated conductors, a plurality of channels for conveying fluid within each of the spaces defined between the permeable insulation of adjacent conductors and the enclosing sheath, some of said channels being permeable to fluid and conveying the same to the insulation upon the conductors, and some of said channels being impermeable to fluid for conveying it from one point to a distant part of said cable, said permeable channels comprising a thin metal ribbon wound flatwise to form a helix, and permeable fillings in the remaining spaces defined within said enclosing sheath.

11. In a multicore, high tension, oil filled electric cable, a plurality of conductors, a covering of permeable insulation for each of said conductors, an impervious sheath enclosing said insulated conductors, a plurality of channels for conveying fluid within each of the spaces defined between the permeable insulation of adjacent conductors and the enclosing sheath, some of said channels being permeable to fluid and conveying the same to the insulation upon the conductors, and some of said channels being impermeable to fluid for conveying it from one point to a distant part of said cable, said permeable channels comprising a thin metal ribbon wound flatwise to form a helix, and electrically conductive permeable fillings in the remaining spaces defined within said enclosing sheath.

LUIGI EMANUELI.